June 17, 1930. G. A. UNGAR 1,765,317
CUTTING BLADE FOR SHEARS
Filed April 28, 1928

INVENTOR
GUSTAVE A. UNGAR
BY Lotka, Kehlenbeck & Harley
ATTORNEYS

Patented June 17, 1930

1,765,317

UNITED STATES PATENT OFFICE

GUSTAVE A. UNGAR, OF PELHAM MANOR, N. Y., ASSIGNOR TO UNISHEAR COMPANY, INC., A CORPORATION OF NEW YORK

CUTTING BLADE FOR SHEARS

Application filed April 28, 1928. Serial No. 273,470.

This invention relates to shears particularly adapted for cutting sheet metal or similar material and which shears are preferably of the type wherein the cutting blades have imparted thereto a rapid stroke of small amplitude to perform the cutting operation and in which the shearing cut is performed by only a relatively small portion of the cutting edges of the blades. The present invention relates to improvements in the cutting blades for such shears and has for its principal object to improve upon the construction and mounting of such blades, so that the screws, or other attaching means which are used for clamping the blades to the blade holders, are substantially entirely relieved from receiving any strain as a result of the forces exerted during the performance of the cutting strokes of the shears. Considered more specifically the object of the present invention is to so construct the blades and the mounting therefor that a single bolt, screw, or other attaching device, may be employed for detachably securing the blade to its respective blade holder, the blade having an irregular shaped outline adapted to be seated within a correspondingly shaped recess, provided in the blade holder, whereby an interlocking engagement of the blade within said recess is secured; the interlocking engagement being such that reaction supports for the blade are provided by the holder which prevent rotation of the blade about the single attaching bolt, as a pivot, as a result of the forces exerted upon the blade during the cutting action of the shears.

A further object of the invention is to improve upon the construction of the cutting blades shown in the co-pending application for Letters Patent in the United States Serial No. 192,834, filed May 20, 1927, by Ulrich F. L. Steindorff and Herbert J. Heller.

Figure 1:
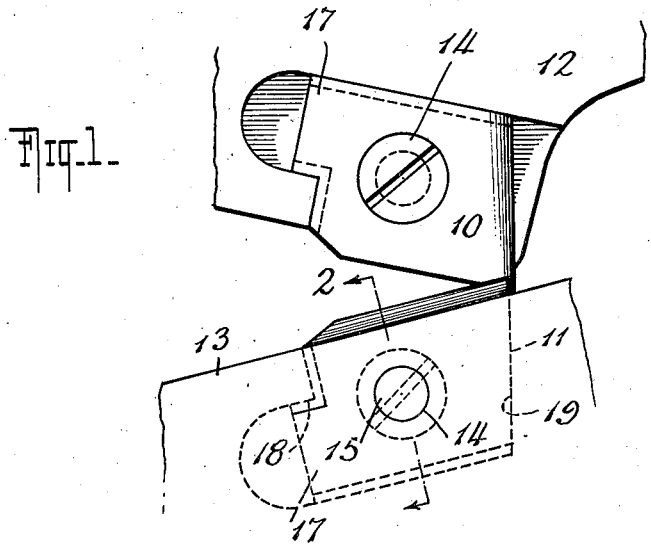
Figure 4:
Figure 2:
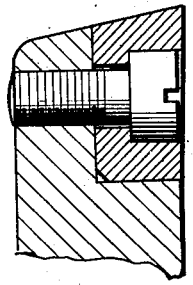
Figure 3:
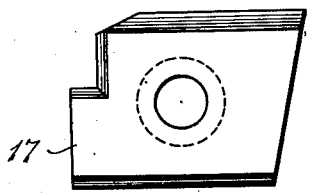
Figure 5:
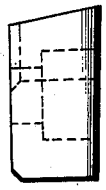

The above and other objects will appear more fully from the following more detailed description and by reference to the accompanying drawing forming a part thereof, wherein Fig. 1 is a side elevation of a pair of cutting blades and a portion of the blade holders in which they are mounted; Fig. 2 is a section on the line 2—2 of Fig. 1; Fig. 3 is a side elevation of one of the cutting blades; Fig. 4 is a plan view of the blade shown in Fig. 3 and Fig. 5 is an end view thereof.

In Fig. 1 of the drawings I have shown a pair of cutting blades 10, 11, secured respectively to the blade holders 12, 13. As shown in this figure of the drawings, the cutting blades comprise relatively short members, having their cutting edges inclined to each other at an angle to provide an open throat into which the material to be cut is adapted to be fed to the blades. The blades shown are particularly adapted for use with that type of cutting shears in which one of the blades is stationary and the other blade is reciprocated very rapidly with a stroke of relatively small amplitude. The amount of amplitude given to the moving blade is such that only a comparatively short length of the cutting edges of the blades, at the inner end of the open throat, is effective to perform a cutting action.

In order to simplify the operation of removing the blades for grinding the cutting edges thereof, or to replace a blade whenever it becomes necessary or desirable, only a single attaching bolt or screw 14 is provided for each blade. For insuring that the flat inner wall of the blade will be tightly clamped along its entire surface to its respective blade holder, each blade is preferably provided approximately at the center thereof with an aperture 15 through which the attaching bolt or screw 14 is adapted to pass, it being understood that the blade holder is provided with a screwthreaded hole with which the threaded end of the bolt 14 is adapted to engage. The attaching screw 14 preferably is a fillister head screw, the head of which is adapted to be received within a counterbore 16 provided in the outer face of each blade in axial alignment with the aperture 15.

As the blades are secured to their respective blade holders by the attaching bolts 14, which are located approximately at the center of the blades, and as, during a cutting stroke, pressure is exerted on the blades only at one end of their cutting edges, it is obvious that rotation of the blades about the attaching screws as a pivot would occur, were means not provided to prevent such rotation.

Such means consist in providing each blade, preferably at the corner thereof diagonally opposite to the effective portion of its cutting edge, with a projection 17 which seats within a correspondingly shaped notch 18, of the recess 19, provided in the respective blade holder.

With a construction such as above described and as shown in the drawings, it will be seen that the interengagement of the projection 17 of each blade with the notch 18 of the recess in the blade holder, forms an effective lock which prevents rotation of the blade about the axis of the attaching screws 14, as a pivot, when a cutting stroke is being performed. Taking the lower blade 11, shown in Fig. 1, as an example, obviously the pressure exerted between the blade and the work during a cutting stroke would tend to rotate the blade in a clockwise direction about the axis of the attaching screw 14. The upper edge of the recess 18, however, forms what may be termed a reaction support that effectually resists the turning moment and holds the blade in its proper fixed condition.

In addition to simplifying the operation of removing and replacing a blade, the construction and arrangement is such that no appreciable strain is placed upon the attaching screw 14, the reactions of the forces exerted during a cutting stroke being transmitted through the blades to the rigid walls of the blade holder which bound the recess 19 thereof.

While I have shown the projecting tab 17 as located diagonally opposite to the effective portion of the cutting edge of each blade, it will be understood that the invention is not limited to the particular location of the tab shown in the drawings but that the same effect could be secured by locating such tab at practically any other point of the bounding walls of the recess 19. It will also be understood that many other changes, variations and modifications could be resorted to without departing from the spirit of my invention.

I claim:

1. A cutting blade for power driven shears of the type wherein a pair of cutting blades are mounted upon blade holders with their cutting edges inclined to each other to provide an open throat into which the material to be cut is adapted to be fed, each of said blade holders being cut away on one face thereof to provide a recess which is open both on the lateral face and at one end of said blade holder and in which its respective cutting blade is adapted to be seated, means for detachably fastening said blade within said recess, and said blade and blade holder in one wall of said recess being provided with interlocking engaging means which prevent rotation of said blade holder about the axis of said attaching means.

2. The combination with a shears having a pair of blade holders, each of said blade holders being cut away on one face thereof to provide a recess which is open both on the lateral face and at one end of said blade holder, and adapted to receive a cutting blade, of a cutting blade seated within said recess, said blade and one of the bounding walls of said recess being provided, one with a projection and the other with a notch into which said projection is adapted to be seated.

3. The combination with a shears having a pair of blade holders, each of said blade holders being cut away on one face thereof to provide a recess which is open both on the lateral face and at one end of said blade holder, and adapted to receive a cutting blade, of a cutting blade seated within said recess, and a single attaching screw located approximately at the center of said cutting blade for securing said blade within said recess, said blade and one of the bounding walls of said recess being provided, one with a projection and the other with a notch into which said projection is adapted to seat for preventing rotation of said blade about said attaching screw as a pivot.

In testimony whereof I have hereunto set my hand.

GUSTAVE A. UNGAR.